United States Patent [19]
Bell et al.

[11] 3,739,688
[45] June 19, 1973

[54] MILLING MACHINE HAVING A PLURALITY OF MILLING STATIONS

[75] Inventors: Walter Bell, Monroe; William A. Eager, Cornwell, both of N.Y.

[73] Assignee: Star Expansion Industries Corporation, Mountainville, N.Y.

[22] Filed: Sept. 3, 1971

[21] Appl. No.: 177,662

[52] U.S. Cl. .................. 90/21 R, 90/11 R, 90/17, 29/561, 10/4
[51] Int. Cl. ............................................. B23c 9/00
[58] Field of Search .............. 90/21 R, 21 A, 21 B, 90/21 C, 20, 11.4, 17, 11 R; 10/4, 9, 21; 29/561, 564

[56] References Cited
UNITED STATES PATENTS

| | | | |
|---|---|---|---|
| 3,545,336 | 12/1970 | Savko | 90/21 R X |
| 3,210,786 | 10/1965 | Moeltzner | 90/20 X |
| 2,942,527 | 6/1960 | Bowen | 90/20 |
| 1,033,837 | 7/1912 | Smith | 90/20 X |

*Primary Examiner*—Gil Weidenfeld
*Attorney*—Abraham Friedman and Abraham Goodman

[57] ABSTRACT

A milling machine for forming drilling extremities on screw blanks. The milling machine comprises a plurality of article-milling stations, each of which is provided with milling-cutters respectively which are pivotally displaceable relative to each of the stations. A feeding assembly is utilized for continuously feeding articles in dwell-free relation successively to each of the milling stations and is controlled by a motor unit so as to feed the articles to and away from the article-milling stations respectively in dwell-free relation at a rapid accelerating withdrawal rate away from each of the article-milling stations and a rapid decelerating approach rate toward each of the article-milling stations. The milling-cutters are pivoted into a cutting position respectively and remain in the position as the article-feeding unit feeds screw blanks slowly into contact with each of the cutters at a rate suitable for material removal. The cutters are then pivotally displaced away from the cutting positions and the screw blanks are rapidly displaced away from the cutting station to again be acted upon at a second milling station, wherein the rate of feed will again be reduced but never stopped.

13 Claims, 13 Drawing Figures

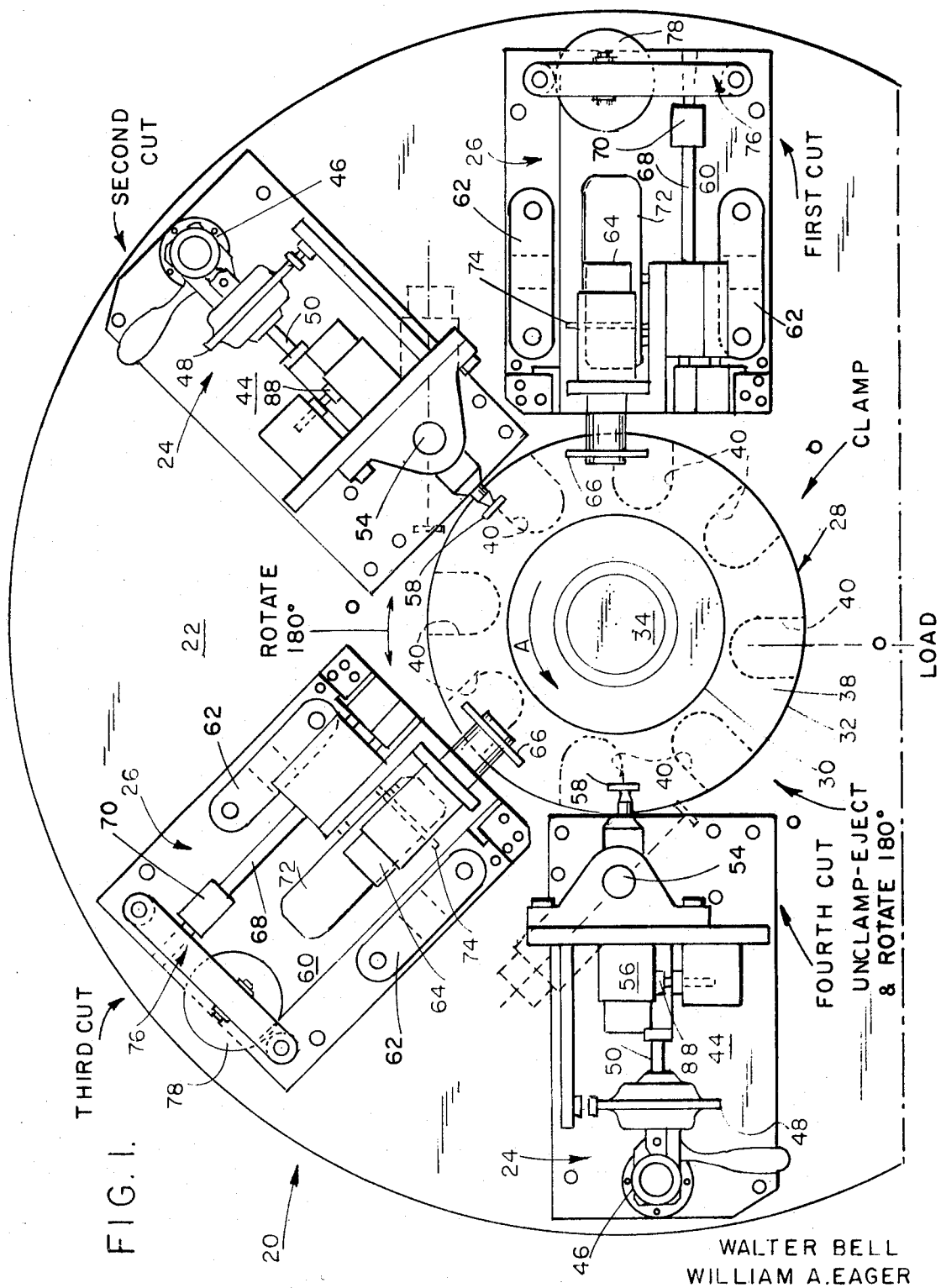

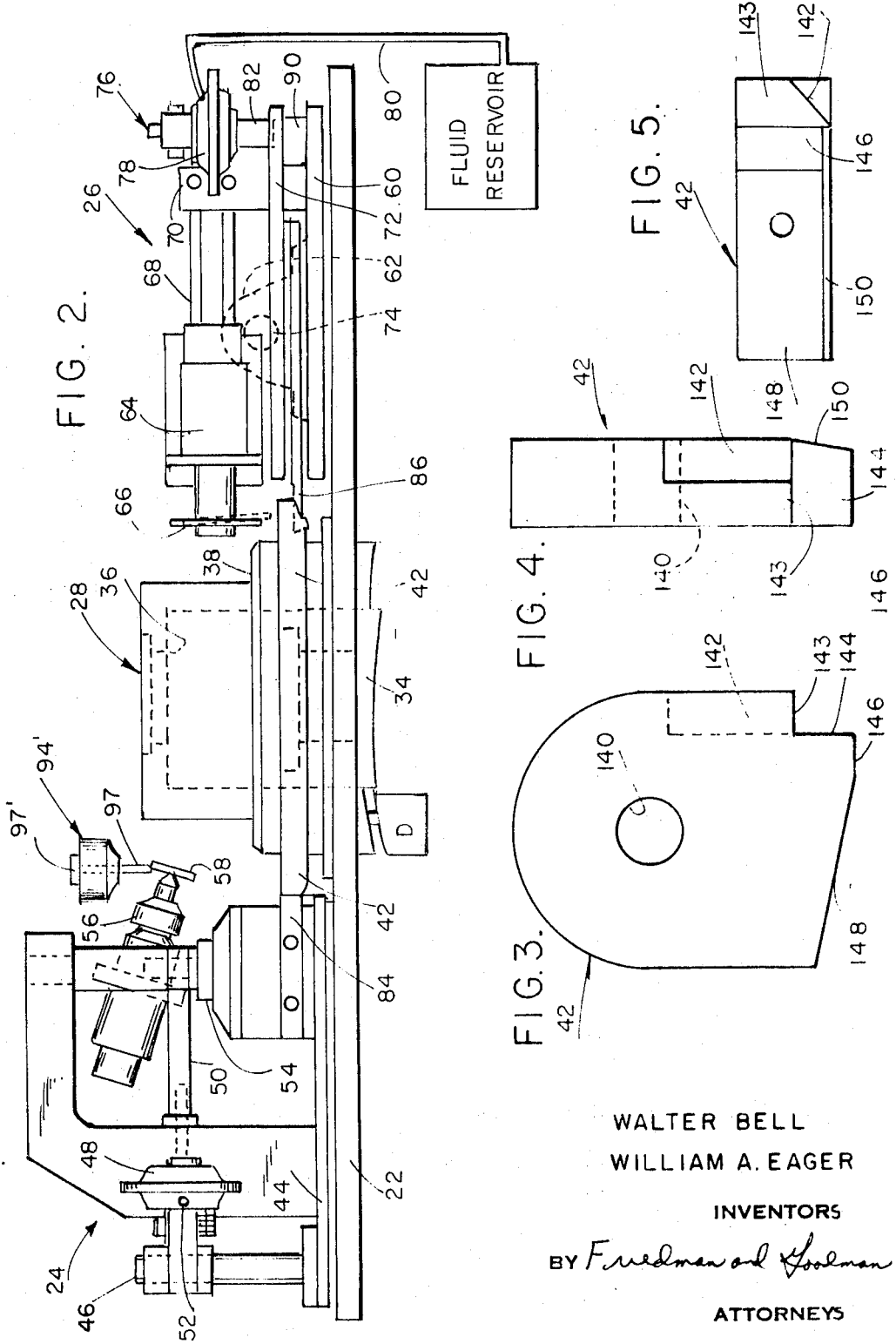

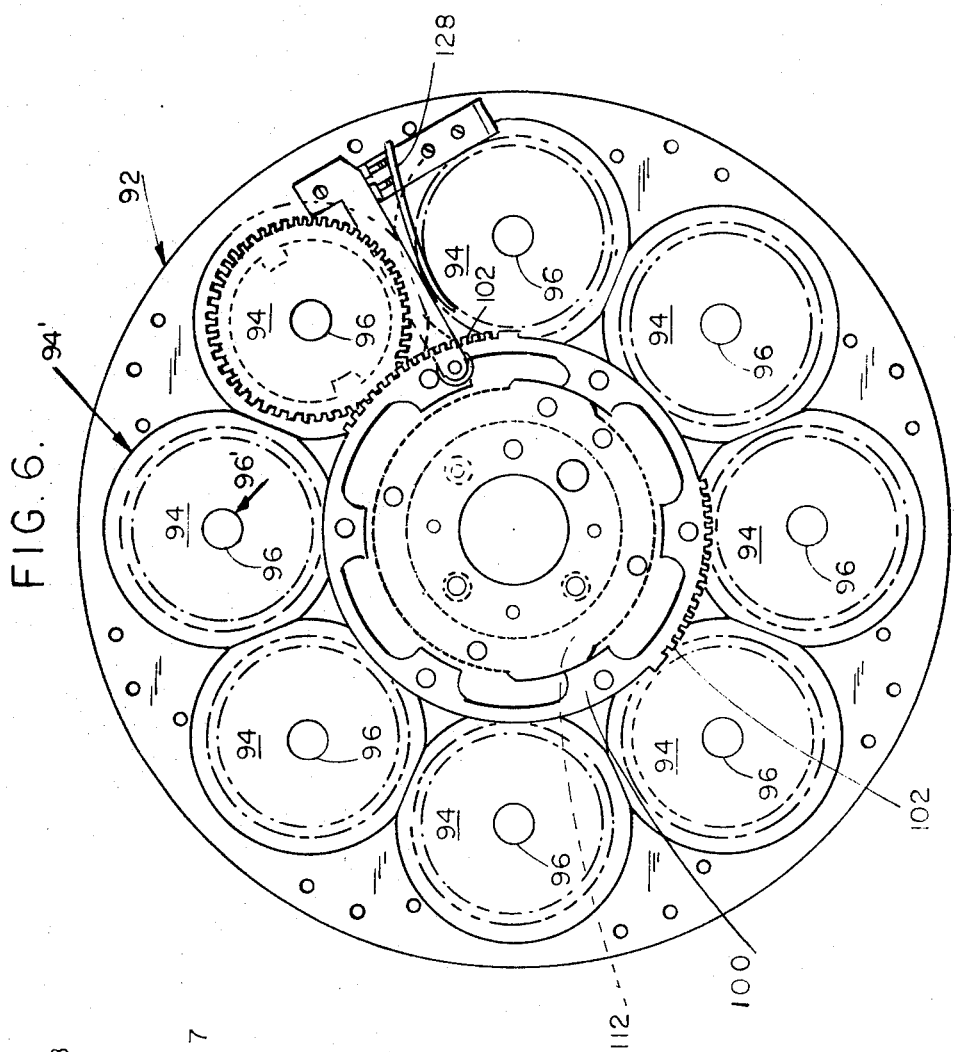
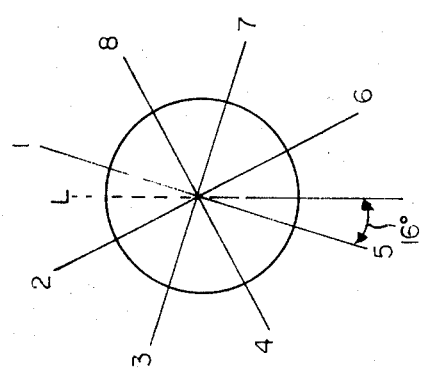
WALTER BELL
WILLIAM A. EAGER
INVENTORS
BY Friedman and Goodman
ATTORNEYS

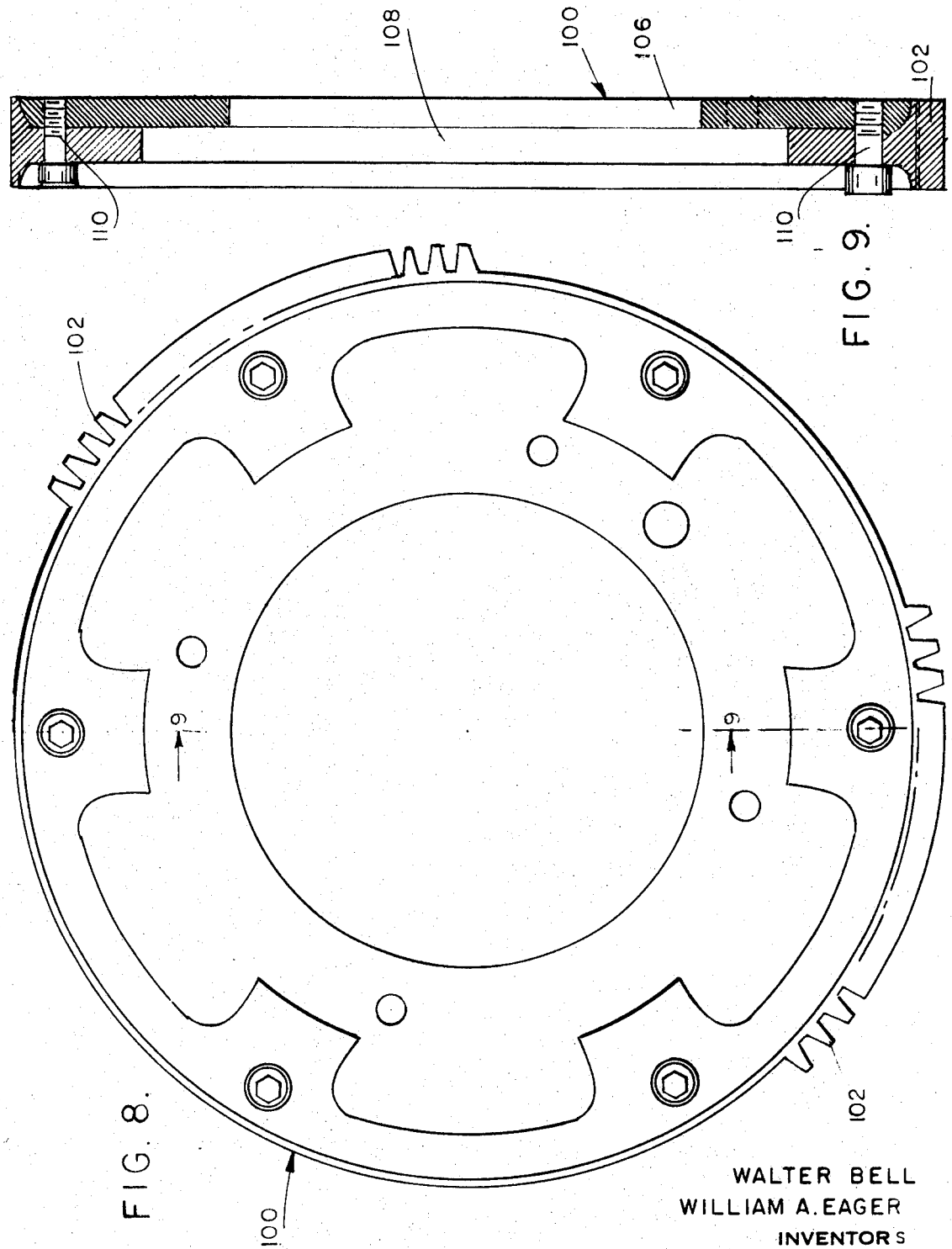
WALTER BELL
WILLIAM A. EAGER
INVENTORS

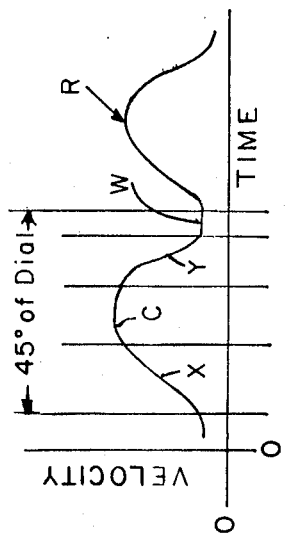
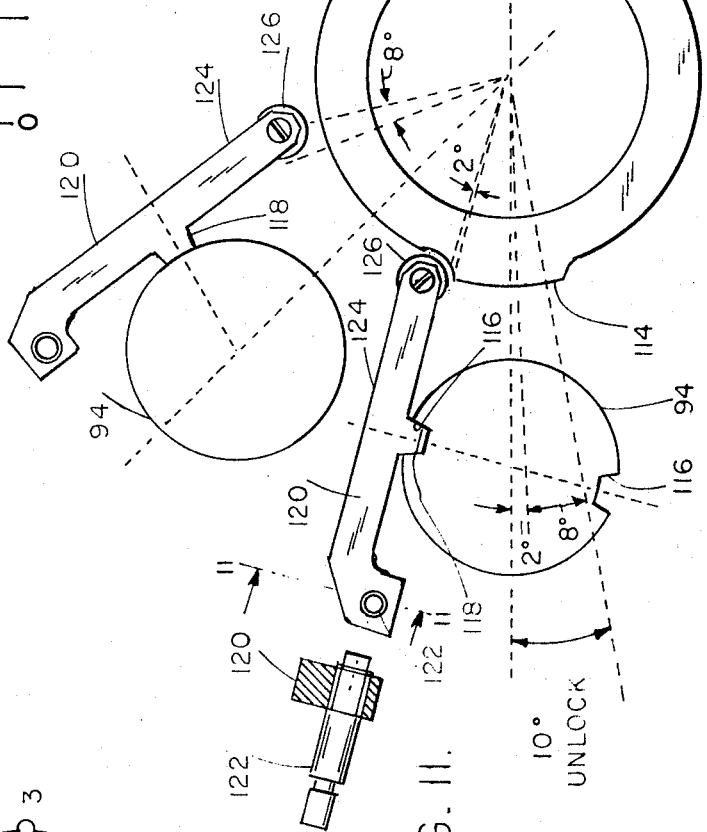
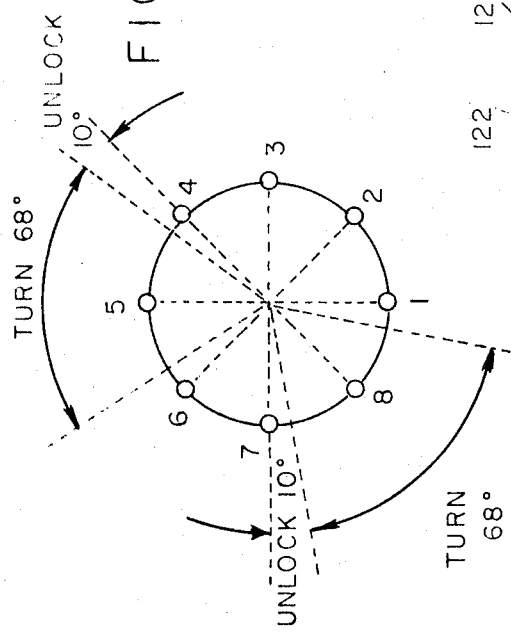
WALTER BELL
WILLIAM A. EAGER
INVENTORS
BY Friedman and Goodman
ATTORNEYS

MILLING MACHINE HAVING A PLURALITY OF MILLING STATIONS

BACKGROUND OF THE INVENTION

The present invention relates generally to milling machines, and more particularly to a milling machine which incorporates a feeding-assembly for feeding screw blanks in a continuous dwell-free manner toward and away from associated cutting stations.

The conventional milling machine generally incorporates a rotatable platform onto which screw blanks may be fed successively and from which the finished articles may be successively ejected. The rotatable platform generally carries each screw blank toward one or a plurality of cutting-stations, whereat the blanks are operated upon successively. The platform is generally rotated intermittently or indexed so as to approach a cutting station and stop at the latter, thus, permitting an associated cutter to be fed toward the blank and perform a respective milling operation thereon. After the milling operation at this station has been completed, the respective cutter is then withdrawn from the vicinity of the blank and the table or platform upon which the blanks are supported, again, starts to rotate so as to bring the very next blank into the vicinity of the first cutting station. Thus, as may be well understood by those skilled in the art, the conventional milling machine does not at all incorporate a continuously rotating platform, but rather utilizes an indexing feed for intermittently starting and stopping rotation of the platform.

The conventional milling machine results, therefore, in a rather time-consuming operation because of the "stop-go" condition thereof. Although the conventional milling machine may be characterized as generally being continuous in operation, the concept of "continuous" is not in fact a truism, since the rotation of the platform upon which the blanks are maintained is actually intermittent.

Furthermore, since the cutters must be gradually fed into engagement with the blanks, as the latter are maintained stationary, there is required in the conventional milling machine, a feeding-assembly which in large measure is rather complex since each cutter of necessity requires not only means for rotating the cutter, but also means for gradually feeding the cutter into engagement with the blanks.

Moreover, since the rotatable platform must be intermittently indexed from one station to the next, so as to successively bring screw blanks into a stationary condition opposite appropriate cutters respectively, there is required a driving assembly for rotating the platform intermittently which is also relatively complex and not necessarily most desirable.

SUMMARY OF THE INVENTION

Accordingly, it is an object of the present invention to provide a new and improved milling machine.

It is still another object of the present invention to provide a milling machine which utilizes a completely continuous driving assembly for rotating a platform, upon which screw blanks are maintained, continuously and in dwell-free relation.

It is another object of the present invention to provide a milling machine that does not at all require means for gradually feeding and controlling the movement of cutters into controlled engagement with screw blanks.

It is a further object of the present invention to provide a milling machine for specifically forming drilling extremities at the end of screw blanks.

It is still further objects of the present invention to provide a milling machine which is positive in operation, convenient to use, easily installed, economical to manufacture, relatively simple and which is most efficient from the standpoint of rapidly milling drilling extremities at the end of screw blanks.

To this end, the present invention relates generally to a milling machine for forming drilling extremities on screw blanks. The milling machine comprises a plurality of article-milling stations, each of which is provided with milling-cutters respectively which are pivotally displaceable relative to each of the stations. A feeding assembly is utilized for continuously feeding articles in dwell-free relation successively to each of the milling stations and is controlled by a motor unit so as to feed the articles to and away from the article-milling stations respectively in dwell-free relation at a rapid accelerating withdrawal rate away from each of the article-milling stations and a rapid decelerating approach rate toward each of the article-milling stations, the speed being reduced just before contact with the cutters to a rate suitable for material removal. The milling-cutters are pivoted into a cutting position respectively and remain in the position as the article-feeding unit feeds screw blanks slowly into contact with each of the cutters. The cutters are then pivotally displaced away from the cutting positions and the screw blanks are rapidly displaced away from the cutting station to again be acted upon at a second milling station, wherein the rate of feed will again be reduced but never stopped.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 1 illustrates a plan view of the association of the cutting stations relative to the rotatable platform upon which screw blanks are to be maintained;

FIG. 2 is a partial elevational view illustrating two cutting stations as operatively associated with cams provided on the rotatable platform for displacing the associated cutters out of engagement with respective screw blanks;

FIG. 3 illustrates a plan view of the top side of a typical cam for displacing the cutters into an inoperative position;

FIG. 4 illustrates a side elevational view of the cam illustrated in FIG. 3;

FIG. 5 illustrates a front elevational view of the cam illustrated in FIG. 3;

FIG. 6 illustrates, in an isolated manner, the operative association of the rotatable platform upon which are rotatably mounted a plurality of planetary gears, each of the latter being associated with a respective screw blank (not shown), and a sun gear as operatively associated with each of the planetary gears;

FIG. 7 illustrates a schematic representation of sequential operations as effected by the milling machine pursuant to the present invention;

FIG. 8 illustrates an enlarged plan view of the fixed sun gear pursuant to the invention;

FIG. 9 illustrates a side-elevational view, partly in cross-section, of the gear illustrated in FIG. 8;

FIG. 10 illustrates a camming arrangement which is fixed to the sun gear for operating upon locking elements associated with each of the rotatable planetary gears;

FIG. 11 illustrates a side elevational view, in cross-section as taken along the line 11—11 in FIG. 10, of the locking element as associated with the rotatable planetary gears;

FIG. 12 illustrates a schematic view of the locking sequence and unlocking sequence of the various locking elements associated with the rotatable planetary gears; and FIG. 13 illustrates graphically the rate of rotation of the rotatable platform;

DETAILED DESCRIPTION OF THE INVENTION

Referring now to the drawings and more particularly to FIG. 1 thereof, the present invention relates generally to a milling machine generally denoted by the reference character 20. The milling machine 20 includes a fixed base 22 upon which are located, in a manner as will be clarified below, a pair of flute-cutting milling stations 24 and a pair of tip-cutting milling stations 26.

An annular rotatable pedestal 28 is concentrically arranged with, and extends through, an appropriate opening (not shown) in the base 22 and is driven counter-clockwise in the direction of arrow A by a suitable drive assembly D, the latter which will be described further below. The pedestal 28 is provided with an inner periphery 30 and an outer periphery 32. A fixed column 34, which is annularly spaced from the inner periphery 30 of the pedestal 28, extends concentrically through a bore 36, illustrated in FIG. 2, provided in the pedestal 28.

The pedestal 28 is, in part, defined by an annular cam-supporting platform 38, the latter which is also defined by the inner and outer peripheries 30 and 32 respectively. The platform 38 is provided with radially extending cam-receiving slots 40 for accommodating respectively cam-inserts 42, the latter which will be described further below.

The milling stations 24 are each provided with a base portion 44 upon which is fixedly connected a pedestal 46, of a configuration illustrated in FIGS. 1 and 2, which pedestal 46 appropriately supports a fluid-controlled diaphragm unit 48. Extending from one portion of the diaphragm unit 48 is an axially displaceable plunger 50, whereas a fluid-receiving orifice 52 communicates with the opposite portion of the diaphragm unit 48, which orifice 52 is supplied with fluid from an appropriate reservoir in a conventional manner at a constant pressure.

The end portion of the plunger 50, that which is most remote from the diaphragm unit 48, is pivotally connected, in a conventional manner by appropriate linkage (not shown), to a cutter-supporting column 54 which is vertical and rotatable about a vertical axis. The cutter-supporting column 54 supports a milling or cutter housing 56, the latter which is inclined relative to the vertical axis of the column 54 and terminates in a rotatable milling or cutting blade 58 which is conventionally driven by an appropriate driven unit positioned internally of the housing 56.

Likewise, the milling stations 26 include a base portion 60 upon which is mounted an appropriate bracket 62 for pivotally supporting a milling or cutter housing 64. The housing 64 rotatably mounts a rotatable milling or cutting blade 66 and extends from a lateral member 68, the latter which is fixed upon a vertical support member 70 (see FIG. 2). The vertical support member 70 is fixed upon a pivotal base member 72, the latter which is pivotally mounted about a horizontally extending pivotal axis 74 (shown in FIG. 2) and is the source of support of the milling cutter housing 64.

A support assembly, generally denoted by the reference character 76, fixedly supports, on the base portion 60 of the stations 26, a fluid-controlled diaphragm unit 78, the latter which communicates at the upper portion thereof with a fluid-supplying conduit 80 and is thereby supplied with fluid at constant pressure from an appropriate fluid reservoir. The opposite portion of the diaphragm unit 78 is operatively associated with a plunger 82 for displacing the latter axially downwardly into engagement with the pivotal base 72.

As illustrated in FIG. 2, each milling station 24 is provided with a follower-arm 84, the latter which is fixed upon the rotatable cutter-supporting column 54 and operatively associated with the cam-inserts 42 respectively in a manner as will be described further below. Moreover, each milling cutting station 26 includes a follower-arm 86 which is fixed to the pivotal base 72 and operatively associated with the cam-inserts 42 respectively in a manner as will also be further clarified below.

As illustrated in FIG. 1, each of the milling stations 24 includes an abutment member 88 against which is engageable the pivotally supported housing 56 for limiting pivotal displacement of the latter to permit a preferred operative orientation as will be described below. Likewise, as illustrated in FIG. 2, each of the milling cutting stations 26 is provided with an abutment 90 against which is engageable, the pivotal base 72 for limiting the pivotal displacement of the latter to a preferred operative orientation in a manner as will also be further clarified below.

Referring now to FIG. 6, a planetary gear-carrying platform 92 is fixed upon the annular rotatable pedestal 28, at an elevation above the milling stations 24 and 26 respectively, the fixed association of the platform 92 upon the pedestal 28 not being illustrated as this is conventionally well understood by those skilled in the art. Journaled freely upon the platform 92 are eight planetary gears 94, the latter which detachably maintain, in a conventional manner, screw or drill blanks 96 respectively, each of the blanks 96 having an end portion 97 which is exposed well below the confines of the planetary gears 94 to be operated upon by the cutters 58 and 66 respectively in a manner schematically illustrated in FIG. 2. The manner by which the blanks 96 are detachably secured in each of the planetary gears 94 is conventional, easily understood by those skilled in the art and not illustrated herein for the sake of clarity.

Each of the planetary gears 94 is provided peripherally, over the full circumference thereof, with a plurality of radially extending teeth 98 (only one such gear shown entirely in FIG. 6) for operative association with a sun gear 100, the latter which is fixed upon the fixed column 34 and concentrically arranged within the planetary gear-carrying platform 92.

The sun gear 100 is provided with two spaced groups of teeth 102 for operative association with each of the planetary gears 94 in a manner as will be described below. Each of the groups of teeth 102 is spaced from one another by approximately 75°, each extending over approximately 68° and generally identical in number, each group having approximately 22 teeth. The sun gear 100 is generally constituted of, as illustrated in FIG. 9, a lower plate 106 upon which is mounted a gear plate 108. The gear plate 108 and lower plate 106 are each interconnected such as by means of bolts 110.

Referring now to both FIGS. 6 and 10, mounted below and fixed to the sun gear 100 is an annular cam plate 112, the latter provided with a pair of spaced camming lugs 114. The lugs are spaced from one another by approximately 104° and are provided for the purpose as will be further clarified below.

The hub portion of each of the planetary gears 94 is provided a pair of inwardly extending radial slots 116 spaced outside one another diametrically. Each of the slots 116 is adapted for accommodating locking projections 118 respectively extending generally transversely from the medial portion of locking levers 120 respectively. The locking levers 120 are pivotally mounted upon the platform 92 so as to permit detachable insertion of the respective projections 118 into each of the slots 116 respectively, each of the locking levers 120 being operatively associated with the planetary gears 94 respectively in a manner as is generally illustrated in both FIGS. 6 and 10.

Each of the locking levers 120 is provided with both an end portion 120, that which is the end portion pivotally supported upon the platform 92 and a free-end cam-follower portion 124, the latter including a pivotal cam-follower roller 126 for operative association with the camming lugs 114 in a manner as will be further clarified below. Furthermore, as illustrated in FIG. 6, each of the locking levers 120 is continuously biased and urged into contact with the respective planetary gears 94 such as by a leaf-spring 128, the latter effecting detachable insertion of the locking projections 118 into the slots 116 respectively of the planetary gears 94.

In order to clarify the significance and function of each of the elements which constitute the milling machine pursuant to the present invention, there will now be discussed briefly, the operation of the milling machine. Generally speaking, metallic blanks having an upper head portion 97' (see FIG. 2) and a lower shank portion 97, are successively fed, in a conventional manner, to a loading station generally denoted by the reference character L in FIG. 7, and as the platform 92 is continuously rotated, one of the planetary gears 94, and associated clamping structure (not shown because of its conventional nature) in a position 1 in FIG. 7, is in a condition for receiving a metallic blank as it passes from position 1 in a counter-clockwise direction toward the loading station L. Each of the planetary gears 94 is provided with appropriate clamping structure (not shown because of the conventional nature thereof) so as to receive the blanks successively as they are fed from the loading station L.

It is important to understand that the head 97' of each of the metallic blanks is generally clamped or secured in the respective planetary gears 94 so as to prevent slippage and rotate therewith as the platform 92 rotates and as the planetary gears 94 rotate both together with and relatively to the platform 92. Moreover, the endmost portion 97 of the shank is exposed relative to the planetary gears 94 in a manner merely schematically illustrated in FIG. 2 so as to be brought into engagement with the uppermost portion of the cutter blades 58 and 66 and thereby operated upon so as to be transformed into a drilling extremity.

In this respect, the cutter blades 58, which are associated with the flute-cutting milling stations 24 respectively act to form a somewhat partially helical elongate groove in the exposed free-end portion 97 of the metallic blanks, whereas the cutters 66 associated with the tip-cutting milling stations 26 respectively, act on the exposed free-end portion 97 of the metallic blanks to form what is conventionally characterized as a partially conical tip.

It is significant to point out that although there is no illustration of conventional structure for automatically loading each of the metallic blanks which are to be milled and provided with a drilling extremity planetary gear the apparatus pursuant to the present invention, and thereafter, operated upon by structure also not shown and which does not form any part of the present invention, so as to be provided with threaded convolutions and, thus, characterized as a drill screw, it is obvious that the screw blanks may be fed manually into position, such as that position denoted by the reference character 96 in each of the planetary gears 94 in FIG. 6 so as to be clamped in a conventional manner therein. This is only pointed out to clarify that structure for feeding the screw blanks into position does not necessarily form the basis of the present invention.

In order to fully understand just what happens to the screw blanks as they are fed into position and clamped in the respective planetary gears 94, it is best to choose a particular planetary gear and the blank associated therewith and follow the sequential operations as effected by the present invention.

Therefore, referring to FIGS. 1, 2, 6 and 7, a particular screw blank 96' is fed into position at the loading station L and as that planetary gear 94, which is at position 1 in FIG. 7, is moved from position 1 to the loading station L, the particular screw blank 96', by appropriate means, is mounted into that planetary gear 94, hereafter referred to as 94', such that the free-end portion 97 of the shank thereof is exposed so as to engage the cutters 58 and 66, the latter illustrated in FIG. 2. The platform 92 is continuously rotated counter-clockwise in the direction of arrow A in FIG. 1, so as to carry the aforementioned blank-carrying planetary gear 94' to position 2 in FIG. 7. The annular platform 92, which is fixed upon the annular pedestal 28, is continuously rotated and never stopped.

In this respect, the drive D is associated with, in a manner only schematically illustrated in FIG. 2, the pedestal 28 so as to rotate the latter continuously and not intermittently. Expanding upon this somewhat, it is conventional in the art to provide a motor of constant output and connect the latter to a rotatably supported member to be driven by the motor, through the intermediary of appropriate transmission means, such as that of camming elements which are rotated at a constant speed yet have associated therewith follower lugs extending axially and spaced circumferentially relative to one another from the rotatably supported member to be driven. In this respect, the member to be driven is that of the pedestal 28 from which axially extend eight follower-lugs, one for each station, the latter pedestal which is rotated continuously yet accelerated and decelerated selectively pursuant to the intelligence supplied by appropriate drive cams, the latter which may be characterized as feed-control means for controlling the rate of feed or rotation of the pedestal 28. Thus, although the means for driving the pedestal 28 continuously, that which is denoted by the reference character D in FIG. 2, is not fully illustrated in the drawings, the drive D is simply a conventional expedient understood by those skilled in the art and, therefore, not illustrated for the sake of clarity.

In the instance of the preferred embodiment, the drive D for driving the pedestal 28 is appropriately provided with cams for continuously, in dwell-free relation, rotating the pedestal 28 such that the latter is selectively accelerated and, thereafter, decelerated during its course of rotation. The term "dwell-free" relation is chosen herein to characterize the nature of rotation of the pedestal 28, i.e., continuously without intermittency, and does not refer to the nature of the cams for rotating the pedestal 28. The acceleration and deceleration will be further clarified below.

In this respect, as illustrated in FIG. 13, the acceleration and deceleration is effected along a curve R defined by a vertical axis denoting velocity and a horizontal axis denoting time. The periods of acceleration and deceleration are denoted by the intervals X and Y respectively, and are separated from one another through the intermediary of the interval C denoting a generally constant rate of rotation of the platform 28. Each acceleration generally defines the rate of withdrawal away from respective milling stations and each deceleration generally defines the rate of approach toward each milling station. Moreover, each deceleration terminates or generally merges into a further portion of the curve R, denoted by W, that which is also generally a constant rate of rotation of pedestal 28 and represents a slow rate of rotation of the latter for cutting or material removal from the respective blanks. The entire portion of the curve R from acceleration through deceleration and the respective cutting speed consumes generally 45° of rotation of the pedestal 28.

Now further following the sequential operations effected upon the exposed free-end portion 97 of the blank which has been carried to position 2 of FIG. 7, there is effected at position 2, clamping of the screw blank in its respective planetary gear 94'. Thereafter, the platform 92 continues to rotate counter-clockwise so as to carry the planetary gear 94' to position 3. Position 3 is that position corresponding to the right-most milling station 26 illustrated in FIG. 1 and as the exposed free-end portion 97 of the blank is carried to position 3, the cutter 66 acts to form a first partial conical tip thereon.

In this respect, since the diaphragm unit 78 is under constant pressure, the plunger 82 acts to depress, as illustrated in FIG. 2, the pivotal base 72 which carries the housing 64 thereon downwardly and thereby elevates the cutter 66 so that the cutter 66 is maintained in position constantly prior to the movement of the free-end 97 of the blank into engagement therewith. It should be clear, therefore, that what takes place at position 3 is the carrying of the blank into engagement with an already positioned cutter. The carrying or displacement of the free-end 97 of the blank into engagement with the cutter is effected by a sequentially timed deceleration in the rotation of the platform 92 so as to permit gradual constant feed of the blank into engagement with the appropriate cutter 66.

After formation of initial partial conical tip on the free-end 97 of the blank, as the pedestal 28 rotates, the appropriate cam insert 42 acts upon the follower 86, in a manner illustrated in FIG. 2 and clarified further below, so as to cause the follower 86 to descent partially thereby overcoming the pressure supplied by the diaphragm unit 78 and plunger 82 and freeing the free-end 97 of the blank from the cutter 66 to permit further carrying of the blank to position 4. Once freed, the gear 94' on the pedestal 28 is sequentially accelerated to rotate away from position 3, thereby accelerating the withdrawal of the blank from position 3.

After the already partially operated upon blank leaves the vicinity of position 3, the withdrawal of the latter blank being effected by an accelerated rotation of the platform 92, the latter blank begins to approach position 4, this position being the location of the flute-cutting milling station 24 which is upper right-most in FIG. 1. Upon approaching the cutter 58 of the station 24, the rate of rotation of the platform 92 is reduced or decelerated so as to permit a gradual feed of the blank into engagement with the already present cutter 58. In this respect, as the free-end portion 97 of the blank approaches the cutter 58, the latter acts to form a generally axial groove in the exposed free-end portion of the blank, which groove is elongate and generally helical in nature.

It must be pointed out that between positions 1 and 4 of FIG. 7, although there is rotation of the platform 92, there is absolutely no rotation of the planetary gear 94' carrying the blank under consideration relative to the platform 92. In this respect, as discussed above, the sun gear 100 is not provided with teeth between positions 1 and 4 and, therefore, as the platform 92 rotates relative to the sun gear 100, the planetary gears 94 will not rotate relative to the platform 92. Moreover, as discussed above, each of the planetary gears 94, as illustrated partially in FIGS. 6 and 10, is provided with an appropriate locking lever 120 for preventing rotation of the planetary gears 94 relative to the platform 92 selectively between positions 1 and 4.

After the cutter 58 of station 24 has formed the helical groove in the free-end portion 97 of the blank a number of different operations begin to occur simultaneously. In this respect, there is first caused engagement of the appropriate insert 42, as illustrated in FIG. 2, with the follower 84 of the rotatable cutter-supporting column 54 thereby causing pivotal displacement of the housing 56 from that position illustrated in solid line in FIG. 1 to that position illustrated in phantom in FIG. 1 thereby freeing the free-end of the blank from the vicinity of the cutter 58 to permit further rotation of the platform 92. Thus, the cam insert overcomes the constant pressure supplied by the diaphragh unit 48 and plunger 50 to permit pivotal displacement of the housing 56 as aforementioned.

Moreover, after the free-end 97 of the blank has been freed, the pedestal 28 is caused to accelerate its rate of rotation to thereby withdraw the blank from position 4 and carry the latter blank to position 5 in FIG. 7. Furthermore, the roller 126 of the free-end cam-follower portion 124 of the locking lever 120 associated with the planetary gear 94' under consideration engages one of the lugs 114 associated with the cam plate 112. This causes the withdrawal of the locking projection 118 from the associated slot 116 thereby permitting the planetary gear 94' under consideration to be rotated relative to the platform 92 over substantially 180° by the teeth 102 between positions 4 and 6 of FIG. 7, the blank not being operated upon at position 5.

In this respect, referring to both FIGS. 7 and 12, positions 1-8 in FIG. 7 corresponding also to positions 1-8 in FIG. 12, the positions of FIG. 12 being reversed in orientation, as the platform 92 is accelerated from position 4 and thereafter decelerated toward position 5 there is effected unlocking of the gear 94' from the associated lever 120, there being substantially 10° of rotation of the platform 92 during which the associated locking lever 120 is fully freed from the planetary gear 94'. The 10° period incorporates a period of 2° along which the roller 126 rides along the inclined portions of the associated lug 114 and thereafter a period of 8° of further rotation until the associated projection 118 is fully freed from the confines of the associated slot 116. Upon rotation of the platform 92, for a period of substantially another 68°, there is completely effected 180° rotation of the planetary gear 94' containing the blank under consideration.

Although the blank under consideration is not operated upon at position 5, the deceleration toward position 5 and acceleration away from position 5, is a necessary expedient so as to permit the adjacent blank-carrying planetary gears 94 to be operated upon at respective positions 1-8 in a manner as is that planetary gear 94' under consideration. Thus, the platform 92 is decelerated in order to properly approach position 6. Position 6 is that which corresponds to the location of the milling station 26 so as to permit the respective cutter 66 to form on the shank end portion 97, a further partial conical tip, in 180° opposed relation, with the initially formed partial conical tip. Likewise, the cutter 66 is maintained in position by means of the constant pressure supplied by the diaphragm unit 78 and will remain in position until it has completed its function and thereafter by means of the respective cam insert 42 will descend well below the end of the blank 97 being operated upon so as to permit the platform 92 to again be rapidly rotated or accelerated away from position 6 and thereafter decelerated as it approaches position 7.

It should be pointed out that after the planetary gear 94' carrying the blank under consideration has been passed beyond the last tooth of the second group of teeth 102 of the sun gear 100 and after the follower roller 126 of the locking lever 120 has passed from the confines of the lug 114 which previously acted to displace the lever 120 from the confines of the planetary gear 94', the leaf-spring 128 which is illustrated in FIG. 6 then acts to urge the locking lever 120 ad thereby the locking projection 118 associated therewith into the appropriate slot 116 of the planetary gear 94' so as to lock the latter and prevent further rotation of the planetary gear 94' relative to the platform 92 until again acted upon next by a camming lug 114 on the cam plate 112. Thus, between the positions 6 and 7 illustrated in FIG. 7, there is absolutely no rotation of the planetary gear 94' relative to the platform 92 so that the appropriate cutters at the positions 6 and 7 may properly act upon the exposed free-end 97 of the blank under consideration.

In this respect, after the cutter 66 of station 26, that which is upper left-most in FIG. 1, has been displaced to free the free-end 97 of the blank under consideration therefrom, the platform 92 is again accelerated away from position 6 and thereafter decelerated as it approaches position 7. At position 7, there is located the left-most, as in FIG. 1, flute-cutting station 24 which acts to form in 180° opposed relation with the originally formed helical groove in the free-end 97 of the blank under consideration, a final helical groove as the platform 92 gradually feeds the free-end 97 of the blank into engagement therewith. After completion of the two pairs of partial conical tips and helical grooves, the latter effected at positions 3, 4, 6 and 7, the platform 92 is thereafter rapidly accelerated away from the vicinity of position 7 and again a number of operations are simultaneously effected.

In this respect, as the planetary gear 94' leaves position 7, the other camming lug 114 of the cam plate 112 begins to remove the projection 118 of the lever 120 from the slot 116 in the planetary gear 94'.

Thereafter, as the planetary gear 94' accelerates and leaves the vicinity of position 7 rapidly, the locking lever 120 is completely freed from the confines of the planetary gear 94' by one lug 114 of the cam plate 112 so as to permit the teeth 102 of the sun gear to again operate upon the teeth of the planetary gear 94' and rotate the latter relative to the platform 92. This rotation of the planetary gear 94 relative to the platform 92 and the rotation of the platform 92 to carry the planetary gear 94' to position 8 is effected so as to permit unclamping and ejection of the now finished drill blank under consideration from the confines of the planetary gear 94', which blank is fully provided with a pair of partially conical tips and a pair of partial helical grooves in the form of a conventional drill tip.

Ejection of the finished drill blanks, the latter which will be operated upon subsequently by structure not shown for providing threaded convolutions thereon, may be effected in a conventional manner automatically as the planetary gear 94' is rotated relative to the platform 92 and thereby position the clamping structure (not shown) of the planetary gear 94' into alignment with the position 8 after the platform 92 is rapidly accelerated from position 7 and, thereafter, gradually rotated into alignment with position 8. Moreover, it is obvious that the finished drill blank may be manually removed from the associated planetary gear 94' and, thus, the method of ejecting the finished drill blank as the manner by which the initial blank is fed into the planetary gear 94' does not form the basis of the present invention and therefore not illustrated.

Up to this point, the manner by which the cam inserts 42 cooperate respectively with the followers 84 and 86 of the milling stations 24 and 26 respectively, has been only generally described and clarification of this feature will now be expanded upon. In this respect, a typical cam insert 42 is illustrated in FIGS. 3-5. The cam inserts 42 have a general configuration similar to that of the cam-receiving slots 40 provided in the platform 92 and, moreover, are provided with a bore 140 and an inclined side surface 142 for permitting connection and proper alignment of the inserts 42 with the recesses 40 respectively. The inclined surface 142 extends from a front surface 143 rearwardly, which front surface 143 is that portion of each cam insert 42 which extends generally in flush relation with the outer periphery 32 of the platform 92. Projecting radially from the recesses 40 is a side surface 144 which extends in transverse relation with a front surface 146, the latter which is contiguous with an inclined front surface 148. The front surfaces 146 and 148 each have a generally vertical extent and terminate at the lower end portion thereof respectively in an underside inclined surface 150.

Thus, as illustrated in FIG. 2, as the pedestal 28 rotates counter-clockwise, the surface 144 of a cam insert 42 will engage the follower 84 of the milling station 24 and thereby cause the latter follower 84 to be displaced pivotally thereby swinging the housing 56 of station 24 into a position shown in phantom in FIG. 1. As the platform 92 continues to rotate, the surfaces 146 and 148, thereafter, remain in engagement with the follower 84 and permit a gradual return of the housing 56 to that position shown in solid line in FIG. 1. The inclined underside surface 150 of the cam inserts 42 are utilized for engaging the followers 86 of the stations 26 to thereby depress the follower 86 and thus cause the pivotal descent of the housing 64 and the blade 66 thereof away from the vicinity of each blank after operating upon the latter.

Thus, the cam inserts 42 act to overcome the constant pressure supplied by the diaphragm units 48 and 78 of the milling stations 24 and 26 respectively. The diaphragm units however maintain the cutter housings 56 and 64 of the stations 24 and 26 respectively in constant position so that the rotatable platform 92 may be gradually rotated as each blank approaches the respective cutters. After each of the cutters have performed, as described above, the cam inserts 42 then effect displacement of the cutter housings so as to permit rapid rotation or acceleration of the platform 92 and thereby the blank carried in the respective planetary gears 94 away from the respective milling stations.

It should be clear from the above discussion and description of the milling machine pursuant to the present invention that the sequential operations are done continuously, in dwell-free relation, and not at all intermittently as done in the prior art. By an appropriate drive unit, the latter which is conventional in the art, the platform 92 is rotated continuously although accelerated and decelerated in selectively timed sequence so as to carry successive blanks slowly toward respective milling stations to permit a cutting of the blank in a preferred orientation and in a preferred configuration. Upon completion of a particular milling operation at a respective milling station, the platform 92 is rapidly rotated or accelerated away from the immediately preceeding milling station in order to enhance the overall productive rate for completion of the milling operations on a particular blank. Each deceleration of the platform 92 and, therefore, the gradual approach of the blanks successively to each of the milling stations permits a controlled and accurate milling operation to be effected. It is important to point out that the rotatable platform 92 is continuously rotated, in dwell-free relation, and never stopped from the time the blanks are appropriately clamped in the planetary gears 94 and, thereafter, ejected upon completion of the entire milling operation thereon.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A milling machine for forming drilling extremities on articles, said milling machine comprising a plurality of article-milling stations, milling means operatively associated in displaceable relation with said article-milling stations respectively for milling articles, feeding means for continuously feeding articles in dwell-free relation successively to said article-milling stations respectively, milling-control means operatively associated with said feeding means for controlling displacement of said milling means relative to said article-milling stations respectively, and feed-control means for controlling the rate of feeding of said articles to and away from said article-milling stations respectively in dwell-free relation from a rapid accelerating withdrawal rate away from each of said article-milling stations to a rapid decelerating approach rate toward each of said article-milling stations.

2. A milling machine as claimed in claim 1 wherein said milling means includes a plurality of milling-cutters operatively associated with said article-milling stations respectively, at least two of said milling-cutters differing from one another for milling different portions of each of said articles and forming different surface-configurations in the latter portions respectively.

3. A milling machine as claimed in claim 2 wherein said feeding means includes a rotatable platform and article-carrier means for detachably securing articles respectively on said rotatable platform and exposing end portions of said articles respectively to said milling-cutters.

4. A milling machine as claimed in claim 3 wherein said article-carrier means includes a plurality of gears freely journaled on said rotatable platform, said rotatable platform being of annular extent and having an inner and outer periphery, said feeding means including a fixed gear concentrically arranged internally of said rotatable platform and operatively associated with each of said freely journaled gears on said rotatable platform.

5. A milling machine as claimed in claim 4 wherein said feed-control means includes means operatively associated with said rotatable platform for varying selectively rate of rotation of the latter.

6. A milling machine as claimed in claim 5 wherein said article-milling stations extend along the outer periphery of said rotatable platform and said milling-cutters extend generally radially toward said rotatable platform.

7. A milling machine as claimed in claim 6 wherein said rotatable platform includes a plurality of cams in operative association with each of said milling-cutters for displacing the latter out of operative association with exposed end portions of said articles respectively.

8. A milling machine as claimed in claim 7 wherein said article-milling stations respectively include power means for urging said milling-cutters into operative association with the exposed end portions of said articles respectively.

9. A milling machine as claimed in claim 8 wherein said milling-cutters include housings respectively, said housings being pivotally supported on said article-cutting stations respectively, at least one of said milling-cutters having a horizontal pivotal axis and at least another having a vertical pivotal axis.

10. A milling machine as claimed in claim 4 wherein said fixed gear includes two groups of teeth circumferentially spaced from one another along the inner periphery of said rotatable platform.

11. A milling machine as claimed in claim 10 wherein said rotatable platform includes locking means releasably associated with said freely journaled gears for preventing rotation of the latter selectively relative to said rotatable platform.

12. A milling machine as claimed in claim 11 wherein said fixed gear includes camming means in operative association with said locking means and against which the latter is engageable for selectively unlocking said freely journaled gears and permitting rotation of the latter from a first position relative to said platform to a second position relative to the latter.

13. A milling machine as claimed in claim 12 wherein said locking means includes a plurality of pivotally displaceable levers journaled on said rotatable platform and associated with said freely journaled gears respectively, said levers each including a projection extending laterally therefrom, said freely journaled gears each having a slot for receiving each said projection, and resilient means for urging each of said projection toward and into locking engagement with each said slot.

* * * * *